Patented Sept. 8, 1931

1,821,919

UNITED STATES PATENT OFFICE

AUGUST ALBERT, OF MUNICH, GERMANY, ASSIGNOR TO WINTHROP CHEMICAL COMPANY, OF NEW YORK, N. Y., A CORPORATION OF NEW YORK

PROCESS FOR PRODUCING AN ARSENOBENZENE AND THE PRODUCT THEREOF

No Drawing. Application filed September 24, 1926, Serial No. 137,625, and in Germany October 3, 1925.

My present invention relates to crystallized arsenobenzenes and to a process for producing the same.

Hitherto arsenobenzenes could only be obtained in an amorphous, but not in a crystallized form which alone warrants always a uniform quality and absolute purity of the products.

Only in two exceptional cases and then only with arsenobenzenes containing unsubstituted hydrocarbon residues (comp. Bertheim, Handbuch der organischen Arsenverbingungen, page 137), one has succeeded in obtaining arsenobenzenes in a crystalline form. Now it is only the substituted arsenic compounds which are of therapeutical interest; these compounds are, however, impure owing to their amorphous character. It may be easily understood that the degree in which they are tolerable to the human body, the solubility and stability of the said products must vary within rather wide limits. Now the fact that by my new process it is possible to bring such arsenobenzenes into a crystallized form must be regarded as a considerable technical and therapeutical advance in the art.

According to my present invention crystallized arseno-benzenes are obtainable by causing compounds of the general formula:

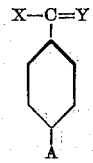

wherein X represents hydrogen or an alkyl group, Y represents oxygen or the group = N.NH.CO.NH$_2$, A represents —As=O or

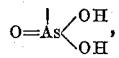

and the benzene nucleus may be substituted, to be acted upon by hypophosphorous acid in the presence of a suitable dissolving or suspending agent. Instead of the hypophosphorous acid one may use a salt thereof which acts as an equivalent. In the latter case an addition of a mineral acid sometimes is advantageous. Furthermore, I wish it to be understood that one may use as starting materials instead of the compounds of the above given general formula the corresponding compounds of the arsenic oxide type, i. e., compounds wherein the arsenic atom is trivalent. When using pentavalent arsinic compounds it is advantageous to add small quantities of hydriodic acid or a salt thereof. Amongst the solvents and suspending agents which are suitable in this process I may mention alcohol and glacial acetic acid. The crystallized arseno benzenes obtainable according to our invention correspond probably to the general formula:

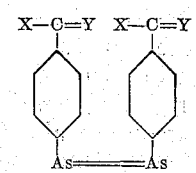

wherein X represents hydrogen or an alkyl group, Y represents oxygen or the group:

= N.NH.CO.NH$_2$.

and the benzene nucleus may be substituted.

The following examples serve to illustrate my invention, but are not intended to limit it thereto.

1. 0.3 grams of meta-hydroxybenzaldehydearsinic acid-semicarbazone are suspended in about 6 cc. of alcohol and dissolved, while heating, with 1,8 cc. of about 6-N. alcoholic hydrochloric acid. To this alcoholic solution of the chloride, when cooled down, there are added about 1,8 cc. of hypophosphorous acid of 25% strength and afterwards about 0,02 cc. of hydriodic acid of specific gravity 1,7. After some time there will separate from the clear, if desired filtered, solution yellow-colored, elongated needles which are frequently pointed and sometimes aggregated in druses. When the crystallization ceases, the arsenobenzene is filtered off by suction and dried in a vacuum. It is soluble in caustic soda to a clear yellow solution. It corresponds probably to the formula:

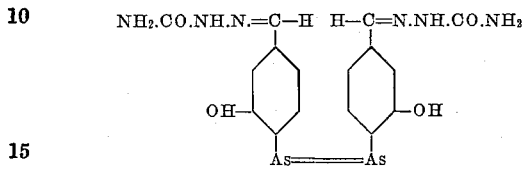

Instead of starting from the arsinic acid, there may first be prepared its chloride, the latter dissolved in alcohol and further reduced as above described.

2. To a solution of 3 grams of dry ammonium hypophosphite in about 42 cc. of dry glacial acetic acid are added 2,1 grams of dry meta-hydroxy-acetophenonearsinic acid-semicarbazone. After the mass has been boiled for about 2 minutes on the reflux-condenser, a clear solution results. The solution is kept boiling for another 15 minutes and then put for 1½ hours on the boiling water-bath. The clear solution may, if desired, be freed, while it is still hot, from any traces of impurities by centrifugation or filtration. From the resulting clear intensely brownish-yellow solution the arsenobenzene, on standing for a considerable time, separates in the form of beautiful elongated very fine rectangular tablets. In order to accelerate the crystallization-process and to maintain the product quantitatively, there are carefully added by drops immediately on the completion of the reaction 5 cc. of water while slightly shaking, whereupon the crystalline separation soon sets in. In order to obtain the arsenobenzene in a quantitative yield it is further advantageous to allow the mass to stand for a prolonged time, whereupon it is filtered off by suction and dried in a vacuum. The product gives a clear solution in caustic soda and decomposes above 200° C. according to the manner in which it is heated.

3. A clear solution of 0,53 grams of para-acetophenone-arsineoxide in 10 cc. of hot glacial acetic acid, after being filtered hot, is mixed with a warm solution of about one gram of sodium hypophosphate in 10 cc. of glacial acetic acid and then carefully heated to boiling on the reflux-condenser while continually slightly shaking. The solution, which is at first clear, begins to become turbid and gradually separates the arseno-benzene in a crystalline form. The product of the reaction, after being boiled for about 15 minutes on an open flame, is brought on a boiling water-bath, and in some cases it is only then that the crystalline separation sets in. After having heated the mass for about one hour the product is allowed to cool, filtered off and dried in a vacuum. The product crystallizes in beautiful light-yellow colored tablets, which are often pointed on both sides and decompose at about 245° C. according to the manner of heating.

4. One gram of meta-hydroxy-acetophenonearsinic acid-semicarbazone is dissolved hot with about 20 cc. of alcohol and 5 cc. of about 6-N. alcoholic hydrochloric acid and, if required, filtered. After cooling, the solution is mixed with about 5 cc. of aqueous hypophosphorous acid of 25% strength and about 0,06 cc. of hydriodic acid. The clear faint yellow solution separates after some time an arsenobenzene product in crystalline form, which constitutes the meta-hydroxy-para-acetophenone arsenobenzene, since by the action of the strong acid it has split off the semicarbazone residue. This arsenobenzene shows the form of pointed needles.

In the following claims the term "diluting agent" is intended to comprise such solvents as are able to dissolve the starting materials to such an extent that the reduction process may be effected, for instance the lower alcohols of the aliphatic series and glacial acetic acid.

I claim:

1. The process for preparing crystallized arseno benzenes which comprises treating a compound of the general formula:

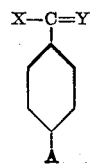

wherein X represents hydrogen or an alkyl group, Y represents oxygen or the group $=N.NH.CO.NH_2$, A represents $-As=O$ or

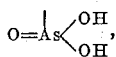

and the benzene nuclei may be substituted, with hypophosphorous acid in the presence of a diluting agent.

2. The process for preparing crystallized arseno benzenes which comprises treating a compound of the general formula:

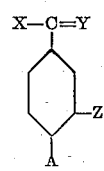

wherein X represents hydrogen or an alkyl group, Y represents oxygen or the group =N.NH.CO.NH$_2$, A represents —As=O or

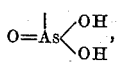

and Z represents hydrogen or a hydroxyl group, with hypophosphorous acid in the presence of a diluting agent.

3. The process for preparing crystallized arseno benzenes which comprises treating a compound of the general formula:

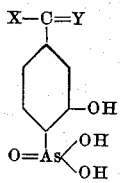

wherein X represents hydrogen or an alkyl group and Y represents oxygen or the group :=N.NH.CO.NH$_2$, with hypophosphorous acid in the presence of a diluting agent.

4. The process for preparing crystallized arseno benzenes which consists in suspending 0.3 parts by weight of meta-hydroxy-benzaldehyde-arsenic acid-semicarbazone in about 6 parts by volume of alcohol, dissolving while heating with 1.8 parts by volume of about 6-N. alcoholic hydrochloric acid solution, cooling and filtering the solution thus obtained, adding about 1.8 parts by volume hypophosphorous acid of 25% strength and about 0.02 parts by volume of hydriodic acid of specific gravity 1.7 and keeping the solution in that state for several hours until crystallization is effected.

5. As new products, arseno benzenes corresponding to the general formula:

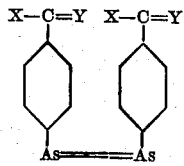

wherein X represents hydrogen or an alkyl group, Y represents oxygen or the group :=N.NH.CO.NH$_2$ and the benzene nuclei may be substituted, being crystallized, yellow colored and substantially pure products.

6. As new products, arseno benzenes corresponding to the general formula:

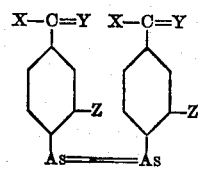

wherein X represents hydrogen or an alkyl group, Y represents oxygen or the group :=N.NH.CO.NH$_2$ and Z represents hydrogen or a hydroxyl group, being crystallized, yellow colored, and substantially pure products.

7. As new products, arseno benzenes corresponding to the probable formula:

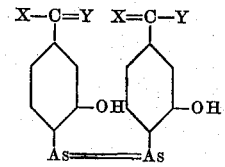

wherein X represents hydrogen or an alkyl group, Y represents oxygen or the group:=N.NH.CO.NH$_2$, being crystallized, yellow colored and substantially pure products.

8. As a new product, the arseno benzene of the probable formula:

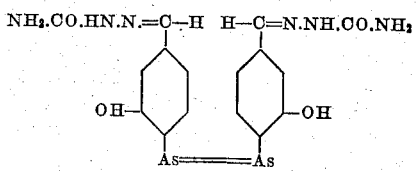

being a crystallized, yellow colored and substantially pure product.

In testimony whereof, I affix my signature.

AUGUST ALBERT.